United States Patent
Sosthène Enguehard et al.

(10) Patent No.: US 10,931,559 B2
(45) Date of Patent: Feb. 23, 2021

(54) DISTRIBUTION OF NETWORK-POLICY CONFIGURATION, MANAGEMENT, AND CONTROL USING MODEL-DRIVEN AND INFORMATION-CENTRIC NETWORKING

(71) Applicant: Cisco Technology, Inc., San Jose, CA (US)

(72) Inventors: Marcel Paul Sosthène Enguehard, Paris (FR); Jordan François Jean Augé, Saint-Cyr-l'Ecole (FR); Giovanna Carofiglio, Paris (FR); Michele Papalini, Issy les Moulineaux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/178,967

(22) Filed: Nov. 2, 2018

(65) Prior Publication Data
US 2020/0145316 A1    May 7, 2020

(51) Int. Cl.
*H04L 12/751* (2013.01)
*H04L 12/24* (2006.01)

(52) U.S. Cl.
CPC .......... *H04L 45/02* (2013.01); *H04L 41/0803* (2013.01)

(58) Field of Classification Search
CPC .................. H04L 45/02; H04L 41/0803
See application file for complete search history.

(56) References Cited

U.S. PATENT DOCUMENTS

| | | | |
|---|---|---|---|
| 9,838,268 B1* | 12/2017 | Mattson | H04L 41/32 |
| 10,148,506 B1* | 12/2018 | Anburose | H04L 41/5006 |
| 2012/0036237 A1* | 2/2012 | Hasha | H04L 67/1095 709/221 |
| 2015/0281079 A1* | 10/2015 | Fan | H04L 12/6418 370/392 |

(Continued)

OTHER PUBLICATIONS

Ruohonen, Evaluating the Network Management Capabilities of YANG and NETCONF, May 2016, Tampere University of Technology, 98 pages.*

(Continued)

*Primary Examiner* — John A Follansbee
*Assistant Examiner* — Raqiul A Choudhury
(74) *Attorney, Agent, or Firm* — Edell, Shapiro & Finnan, LLC

(57) ABSTRACT

A network of routers configure resource nodes connected to the network in accordance with a configuration model including configuration objects that imply resources. A router device among the network of router devices receives, from forwarding paths in the network relative to the router device, originated at the resource nodes and that indicate resources supported by the resource nodes. The router device creates mappings of the resources as advertised to the forwarding paths. The router device receives from the network an Intent request to create a configuration object among the configuration objects, and determines whether the configuration object matches a resource in the mappings. If the configuration object matches a resource in the mappings, the router device generates a new Intent request that identifies the resource, specifically, and forwards the new Intent request along the forwarding path mapped to the resource.

20 Claims, 11 Drawing Sheets

(56) References Cited

U.S. PATENT DOCUMENTS

| | | | | |
|---|---|---|---|---|
| 2015/0350078 | A1* | 12/2015 | Azgin | H04L 45/306 370/392 |
| 2016/0062746 | A1* | 3/2016 | Chiosi | H04L 41/5048 717/104 |
| 2016/0094394 | A1* | 3/2016 | Sharma | H04L 41/0886 709/223 |
| 2017/0126542 | A1* | 5/2017 | Dong | H04L 41/12 |
| 2017/0272326 | A1* | 9/2017 | Ravindran | H04L 41/12 |
| 2017/0289114 | A1* | 10/2017 | Wood | H04L 9/3247 |
| 2018/0069791 | A1* | 3/2018 | Dong | H04L 45/54 |
| 2018/0103128 | A1 | 4/2018 | Muscariello et al. | |
| 2018/0131673 | A1* | 5/2018 | White | H04L 67/2842 |
| 2018/0219790 | A1* | 8/2018 | Azgin | H04L 69/22 |
| 2019/0089811 | A1* | 3/2019 | White | H04L 67/327 |

OTHER PUBLICATIONS

B. Linowski et al., "Extending YANG with Language Abstractions", Internet Engineering Task Force (IETF), Mar. 2011, 75 pages.

Yrineu Rodrigues et al., "Network Intent Composition: Main", https://wiki.opendaylight.org/view/Network_Intent_Composition:Main, Jan. 22, 2015, 10 pages.

S. Hares et al., "Intent-Based Nemo Overview draft-hares-ibnemo-overview-01", IBNemo BOF, Oct. 19, 2015, 23 pages.

"Heat", https://wiki.openstack.org/wiki/Heat, downloaded Aug. 16, 2018, 5 pages.

R. Enns, Ed. et al., "Network Configuration Protocol (NETCONF)", Internet Engineering Task Force (IETF), Jun. 2011, downloaded Aug. 16, 2018, 113 pages.

Georgia Tech, "Kinetic: Verifiable Dynamic Control", http://kinetic.noise.gatech.edu/, 2014, 3 pages.

Carolyn Jane Anderson et al., "NetKAT: Semantic Foundations for Networks", ACM 978-1-4503-2544—Aug. 14, 2001, Jan. 22-24, 2014, 14 pages.

OpenDaylight Project a Series of LF Projects, LLC, "Platform Overview", https://www.opendaylight.org/what-we-do/odl-plafform-overview, 2018, 4 pages.

Teemu Koponen et al., "A Data-Oriented (and Beyond) Network Architecture", ACM 978-1-59593-713-1/07/0008, Aug. 27-31, 2007, 12 pages.

Michele Papalini, "TagNet: A Scalable Tag-Based Information-Centric Network", Oct. 2015, 154 pages.

Panos Georgatsos et al., Object-Oriented Networking, arXiv:1502.07495v1 [cs.Ni], Feb. 26, 2015, 7 pages.

"Vicn", https://wiki.fd.io/view/Vicn, downloaded Aug. 16, 2018, 4 pages.

Alon, Noga et al., "Fast algorithms for Maximum Subset Matching and All-Pairs Shortest Paths in graphs with a (not so) small vertex cover", In: Arge L., Hoffmann M., Welzl E. (eds) Algorithms—ESA 2007. ESA 2007. Lecture Notes in Computer Science, vol. 4698. Springer, Berlin, Heidelberg, https://www.tau.ac.il/~nogaa/PDFS/88rank1.pdf, 11 pages.

* cited by examiner

US 10,931,559 B2

DISTRIBUTION OF NETWORK-POLICY CONFIGURATION, MANAGEMENT, AND CONTROL USING MODEL-DRIVEN AND INFORMATION-CENTRIC NETWORKING

TECHNICAL FIELD

The present disclosure relates to distributing network-policy configuration

BACKGROUND

Recently, there has been a shift to manage networks around software defined networking (SDN) and network concept virtualization (NFV) concepts, centered on the notion of centralized network orchestrators to configured network resources. There has also been widespread adoption of the Internet Engineering Task Force (IETF) Network Configuration (NETCONF) Protocol/Yet Another Generation (YANG) model as defined in Request for Comments (RFC) 6241, and similar proprietary technologies, aimed at replacing a galaxy of representation and transport protocols between users, orchestrators, and network equipment endpoints that host resources to be configured. Such network architectures are typically based on Remote Procedure Call (RPC) calls over Internet Protocol (IP) connections between endpoints, and are mostly centralized around a single, centralized orchestrator. Notwithstanding the maturity of the aforementioned solutions, challenges remain, such as scaling limitations imposed by use of the single orchestrator, and difficulty in federation of independent orchestration authorities.

DESCRIPTION OF EXAMPLE EMBODIMENTS

Overview

A router device among a network of router devices performs a method. The router devices configure resource nodes connected to the network in accordance with a configuration model including configuration objects that imply resources to be implemented as intent, but may not identify the resources specifically and may not identify the resource nodes on which to implement the resources, performs a method. In the method, the router device receives, from forwarding paths in the network relative to the router device, advertisements originated at the resource nodes and that indicate resources supported by the resource nodes. The router device creates mappings of the resources as advertised to the forwarding paths. The router device receives from the network an Intent request to create a configuration object among the configuration objects, and determines whether the configuration object matches a resource in the mappings. If the configuration object matches a resource in the mappings, the router device generates a new Intent request that identifies the resource, specifically, and forwards the new Intent request along one of the forwarding paths mapped to the resource.

Example Embodiments

A centralized approach to configuring network resources (referred to more simply as "resources") is first described in connection with FIG. 11, then distributed approaches based on intent-based (IB)-YANG models are described in connection with FIGS. 1-10.

Figure 11:
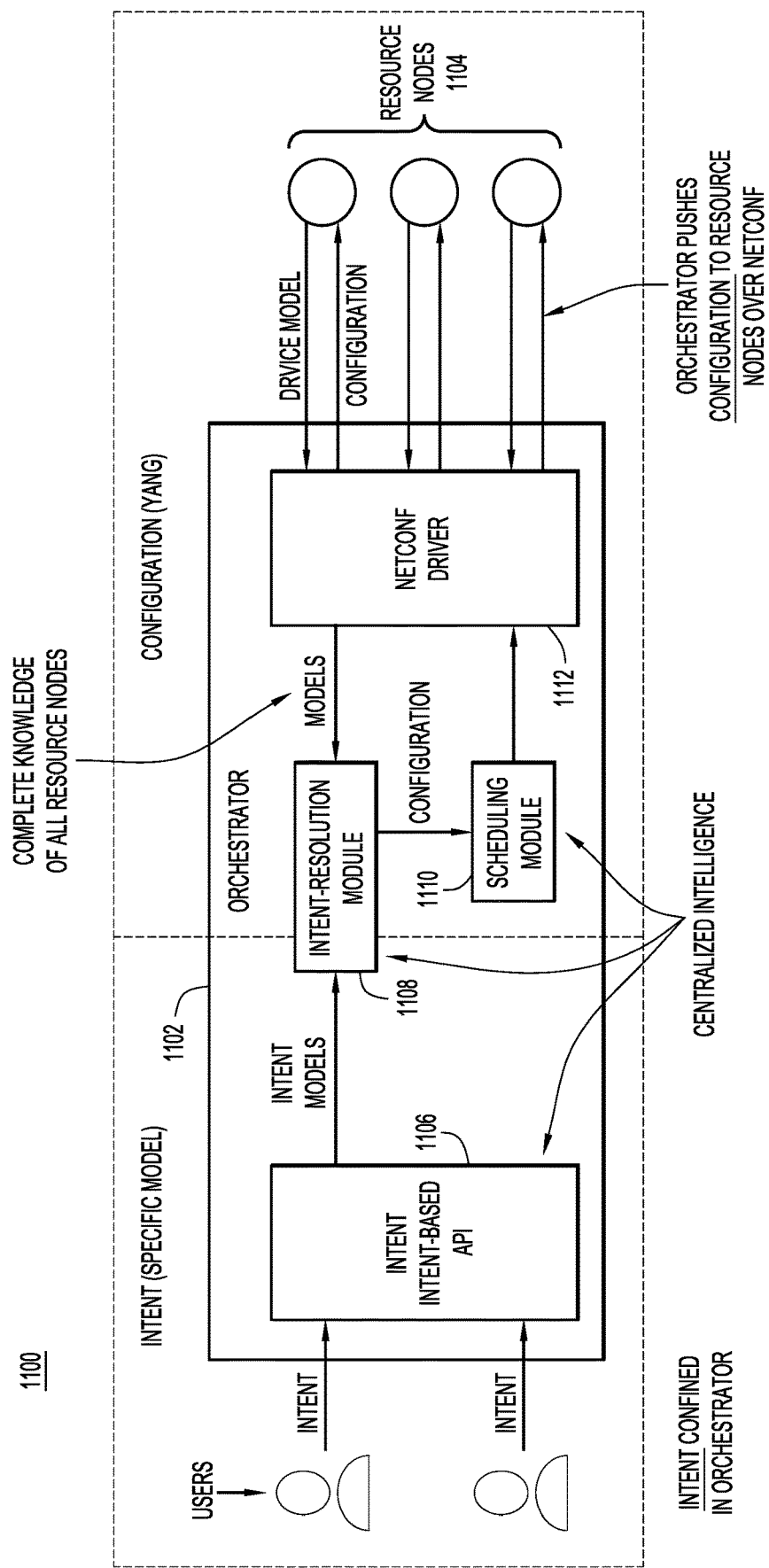
FIG. 11 is an illustration of a system for configuring resource nodes using centralized orchestration rather than distributed orchestration.

With reference to FIG. 11, there is an illustration of a system 1100 for configuring end-devices (also referred to as "resource nodes") using centralized orchestration. System 1100 includes a single, centralized, orchestrator 1102 that pushes configuration to resource nodes 1104. Orchestrator 1102 includes an intent-based Application Programming Interface (API) 1106, an intent-resolution module 1108, a scheduling module 1110, and a NETCONF driver 1112. API 1106 receives configuration intent from users, generates intent models from the user intent, and supplies the intent models to intent-resolution model 1108. NETCONF driver 1112 receives device models (which convey resource capabilities) from resource nodes 1104, and provides the device models to intent-resolution model 1108. Intent-resolution model 1108 generates configuration files based on the intent models and the device models, and provides the configuration files to scheduling module 1110. Scheduling module 1110 provides to NETCONF driver 1112 the configuration files in a scheduled order, and the NETCONF driver pushes the configuration files to resource nodes 1104 as scheduled. The configuration files configure various resource on resource nodes 1104. In system 1100, configuration intent is configured to single, centralized, orchestrator 1102.

Accordingly, embodiments presented herein provide distributed configuration of network resources (i.e., resources) implemented by a network of distributed orchestrator devices (referred to simply as "orchestrators"), which replace the single, centralized, orchestrator shown in FIG. 11. In the embodiments, the orchestrators may include distributed network devices, such as a network of router devices (more simply referred to as "routers"). The distributed orchestrators rely on the NETCONF protocol and YANG models extended to include new designators in accordance with the embodiments presented herein. The extended YANG models are referred to herein as IB-YANG models. YANG is a data modeling language used to define data sent over a NETCONF compliant network to configure resources. NETCONF is used to install, manipulate, and delete configurations of the resources, while YANG is used to model both configuration and state data of the resources. YANG structures data definitions into tree structures and provides many modeling designators, including an extensible type system, formal separation of state and configuration data, and a variety of syntactic and semantic constraints. YANG data definitions are contained in modules and provide a set of features for extensibility and reuse. The Yang data definitions provide configuration objects that describe/identify the resources and how they are to be configured.

At a high-level, embodiments presented herein:
a. Extend designators available to the YANG models to permit the resulting IB-YANG models to define high-level, abstract, configuration "intent" rather than merely specific configurations. The intent implies, but does not explicitly identify, specific configuration descriptions. In other words an abstract configuration object implies configuration of a specific resource, but does not explicitly/expressly identify/specify the specific resource and does not explicitly/expressly identify/specify the specific resource node that hosts the specific resource.
b. Employ techniques to route or forward the intent to resource nodes across a network of orchestrators, which enables a complete decentralization of the processing of the intent, and simplifies offloading of configuration control in an orchestration system.
c. Encode the intent directly into an IPv6 address, thus removing the need for tunnels and overlay-networks.

IB-YANG models may employ features (e.g., designators) directed to (i) abstraction, (ii) inter-device shared models, and (iii) scheduling information in IB-YANG models.

Abstraction in IB-YANG models includes extending standard YANG models to include abstract (i) configuration objects, i.e., configuration objects for abstract services (e.g., "DNS Server," "Node," or "RelationalDatabase,"), which may not specify a particular named service, and may not specify a particular service node to host the abstract service, and (ii) resource inheritance through the "extends" keyword or designator. Advantages include simplifying translation from abstract intent to specific concrete resources since the configuration model and intent model can be partially unified, and permitting resource specialization (e.g., "Node" into Linux Container or Xen Virtual Machine (VM)) to be performed on any node in the forwarding path of the intent rather than at the orchestrator. In the above-mentioned translation from abstract intent to specific intent, it is understood that there is a continuous gradation in intent from the abstract to the specific. Accordingly, as used herein, the term "specific" intent is relative, and may also be construed as a "more specific" intent compared to a "less specific" intent or an "abstract" intent.

Conventional YANG models only describe per-device configuration, which prevents, for instance, offloading of some configuration that concerns two NETCONF devices. Embodiments presented herein provide features to make resource nodes aware of each other by adding foreign abstract keywords/designator to the YANG model. More specifically, a new foreign key/designator of type string called "foreign" may be used to describe foreign models. These foreign models can then be linked to local YANG models through references to "identityref" or "leafref," for example. The introduction of foreign keys/designators allows (i) model consistency verification at the orchestrator, and (ii) orchestration offload. For instance, a Domain Name System (DNS) server can be made aware of the existence of a new node for which the DNS server records a fully qualified domain name (FQDN), and retrieves an assigned IP address directly from the new node, instead of asking a "middle" orchestrator for the IP address. With this approach, a model has an intrinsic existence that is not bound to a particular NETCONF device.

Embodiments also enrich a YANG "grouping" by specifying whether resources can be deployed in parallel or sequentially using, for instance, the "grouping" keyword for resources that can be deployed in parallel and an equivalent keyword "sequence" for resources that must be deployed sequentially. This enables resource nodes to handle orchestration offload, properly. For example, a webserver service may require that its corresponding database be configured and executing before it can be started. The grouping keyword/designator indicates that a specific order is not required when configuring objects, such that the configuration objects may be configured concurrently, while the sequence keyword/designator imposes a specific order when configuring the configuration objects.

Figure 1:
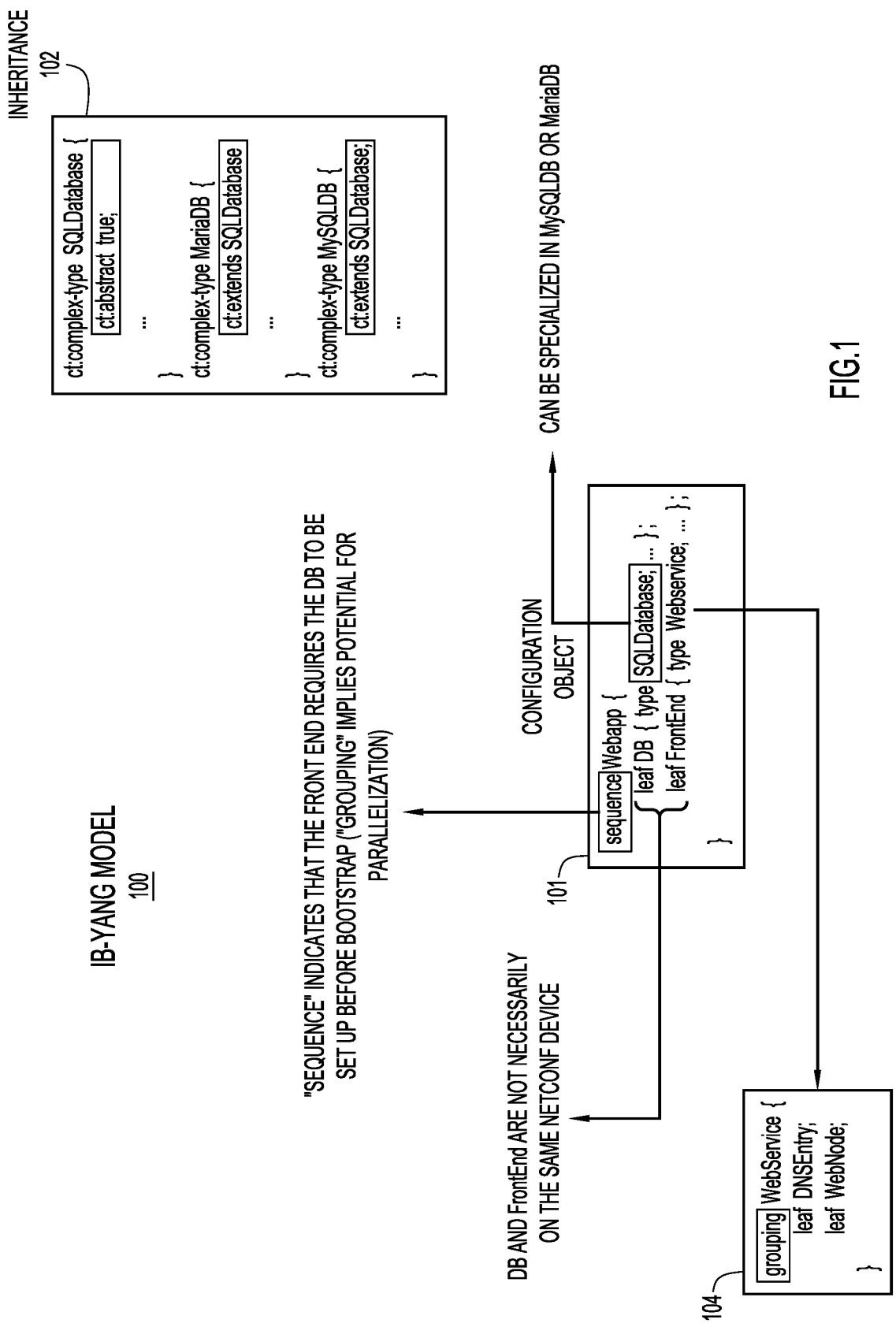
FIG. 1 is an illustration of configuration objects of an intent-based (IB)-YANG model that show abstraction and scheduling of configuration objects, according to an example embodiment.

With reference to FIG. 1, there is an illustration of example configuration objects 100 of an IB-YANG model that show abstraction and scheduling of configuration objects. In the ensuing description, IB-YANG configuration objects are also referred to simply as "objects." Objects 100 include a hierarchical, abstract, object WebApp (indicated at 101 in FIG. 1). WebApp includes/defines further abstract objects database DB and FrontEnd, which occupy a lower hierarchical level than WebApp. Objects DB and FrontEnd are sub-configuration objects or component objects of WebApp. DB is defined as type SQLDatabase, indicating that DB is an SQL database, and FrontEnd is defined as type WebService. Objects WebApp, DB, and FrontEnd are abstract objects because they do not (i) specify/identify specific resource nodes on which they are to be hosted/implemented, so that the objects may be implemented on the same or different resource nodes, and (ii) specify/identify any specific objects, i.e., any specific resource.

Objects 100 also include an abstraction definition module 102 that explicitly defines object SQLDatabase as abstract, and specifies/identifies specific objects, i.e., actual named objects, MariaDB and MySQLDB, as SQL database objects that belong to abstract object/type SQLDatabase. MariaDB and MySQLDB are specifically named SQL databases that may be configured/instantiated on a resource node. Accordingly, abstract object DB of type SQLDatabase implies actual SQL databases MariaDB and MySQLDB as a result of abstraction definition block 102. That is, object DB/SQLDatabase may be specialized in MySQLDB or MariaDB. Abstractions definition module uses the "extends" keyword/designator to invoke resource inheritance, to specify that abstract object DB/SQLDatabase inherits specific resource objects MariaDB and MySQLDB.

As indicated at 104 in FIG. 1, WebService is further defined with a "grouping" keyword/designator, which indicates that WebService includes a "grouping" of objects DNSEntry and WebNode. Moreover, the grouping keyword/designators does not impose any specific order to objects DNSEntry and WebNode, implying a potential to instantiate/configure objects DNSEntry and WebNode either in parallel or concurrently.

Figure 2:
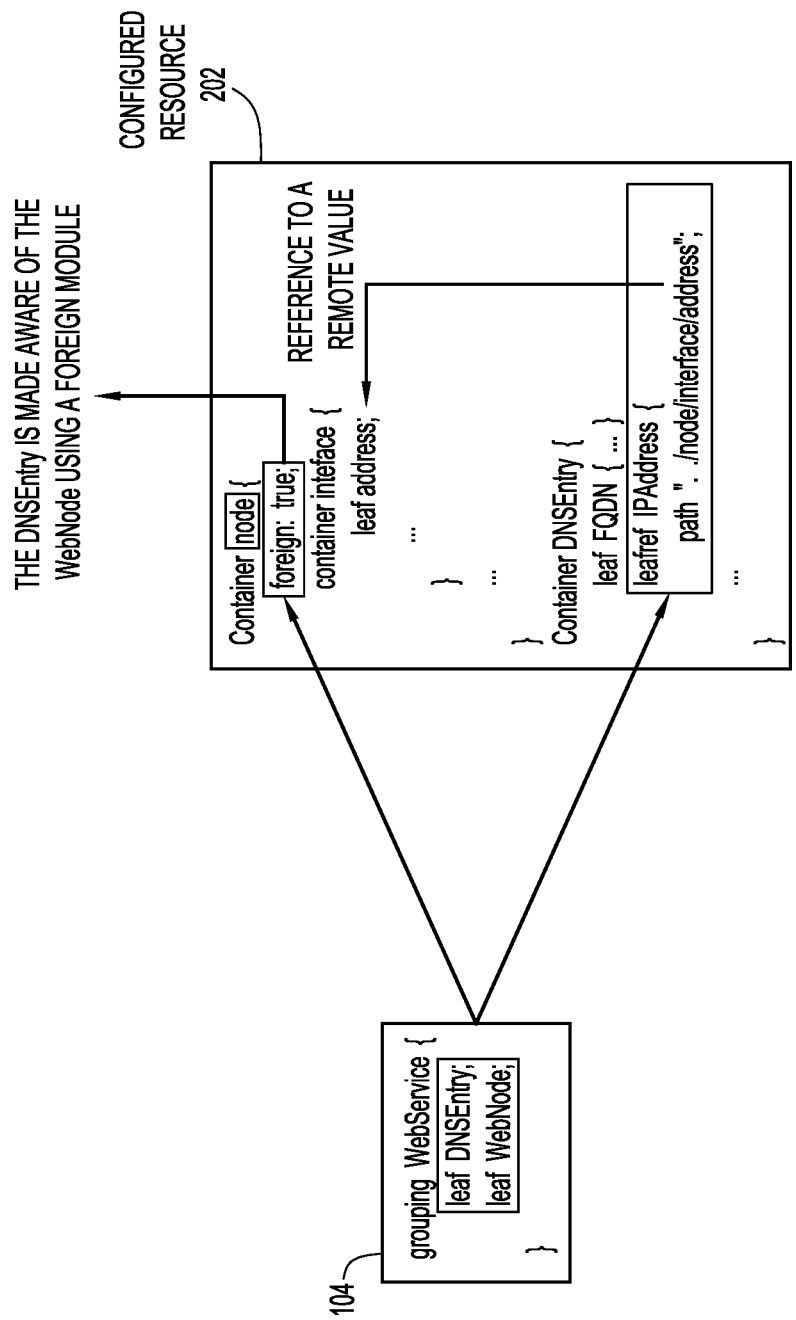
FIG. 2 is an illustration of inter-device sharing using a foreign module of the IB-YANG model of FIG. 1, according to an example embodiment.

With reference to FIG. 2, there is an illustration of an example of inter-device sharing using a foreign module that is based on grouping 104 for WebService, described above in connection with FIG. 1. At 202, FIG. 2 shows two resource nodes Container node and Container DNSEntry configured based on objects DNSEntry and WebNode of grouping 104. Container DNSEntry includes a foreign module descriptor in the form of an IP address "/node/interface/address" that points to/makes reference to Container node for WebNode. Thus, the DNSEntry as instantiated on Container DNSEntry is made aware of WebNode instantiated on Container node, using a foreign module of the IB-YANG. More generally, the foreign module descriptor includes an address pointer from a first object to a second object for use by a first resource corresponding to the first object to access a second resource corresponding to the second object, when the first resource and the second resource are configured on corresponding resource nodes. The first resource and the second resource are configured on the resource nodes responsive to requests (called Intent requests) received by the resource nodes to configure those resources, as will be described below.

Embodiments presented herein extend conventional distribution of configuration description, which relies on vertically pushing the configuration description from an orchestrator to resource nodes, to horizontally routing configuration in the form of intent to resource nodes via orchestrators. The embodiments include an IB-YANG model in which orchestration intent is composed of an action (e.g., embodied in the Remote Procedure Calls (RPC) layer of NETCONF) associated with an object based on the IB-YANG model, which is a generalization of an IB-model. The embodiments rely on replacing the locator-based transport of NETCONF with a forwarding path identifier-based transport that uses the IB-YANG model to find the correct NETCONF device. This approach includes concepts introduced in Information-Centric Networking (ICN), Tag-Based Information-Centric Networking (TAGNET), Data-Oriented Network Architecture (DONA), or Object-Oriented Networking (OON), which route packets based on object-like identifiers.

By creating between orchestrators a routing/forwarding plane directly on the intent and objects associated with the intent rather than on the resource nodes, embodiments presented herein allow orchestrators to communicate directly with one another, removing dependency on a central orchestration platform. The embodiments thus achieve distributed hypervisor-to-hypervisor communication. In particular, the embodiments perform decentralized resource specialization, decentralized resource placement, or decentralized resource scheduling by letting individual devices (with or without an orchestration module) make incremental decisions when and/or where necessary. The incremental decisions can be taken either directly in a Forwarding Information Base (FIB) described below (i.e., in the forwarding path—typically for the smaller increments), or by using an orchestration application (for more complex decisions).

This yields the following advantages:
a. By offloading operations directly at a network edge, the embodiments bring all of the advantages associated with multi-access edge computing (MEC), including low latency applications, preprocessing of data intensive telematics, intelligence offloading, containment of sensitive data in topological areas for security, and so on.

b. By distributing the network orchestration, management, and control, the embodiments scale easily by enabling any node in a network to execute a particular control service, instead of requiring all action to flow through a central authority in sequence. This also reduces the dependency on a single central point of failure, which makes the embodiments more resistant to network partition or network attacks.

c. The embodiments are adapted to federation/broker models. In particular, the embodiments allow several MEC deployments in separated networks to communicate one with another. This is useful when a service is moved from one network to another. In this regard, the embodiments realize a unified control plane across network domains, which comports with the 5G architecture.

The embodiments envisage multiple use cases for a distributed management engine, including but not limited to:
a. Dynamic policy management: especially in contexts requiring ephemeral state and thousands of policy changes per second.
b. Realizing MEC with dynamic instantiation of virtual resources.
c. Supporting Mobility in a 5G network.

The following additional gains may be expected from the extended IB-YANG model, which are realized transparently over a network in a distributed fashion:
a. Objects can be easily manipulated by users using graphical user interfaces (GUIs) or object-oriented programming language. It is sufficient to provide object-to-query mappings for different languages to allow a user to transparently program devices distributed over a network, together with their requirements and relative dependencies.
b. The IB-YANG model lends itself naturally to inheritance and composition, which adds value to the resources exposed by a network. This opens the way to higher level control and validation such as proposed by KINETIC, a domain specific language used for verifiable network control.

Embodiments presented herein also provide routers that can handle IB-YANG-based forwarding (referred to simply as "IB-YANG forwarding"), as described above, using a forwarding solution that mimics the functioning of an ICN router.

Figure 3:
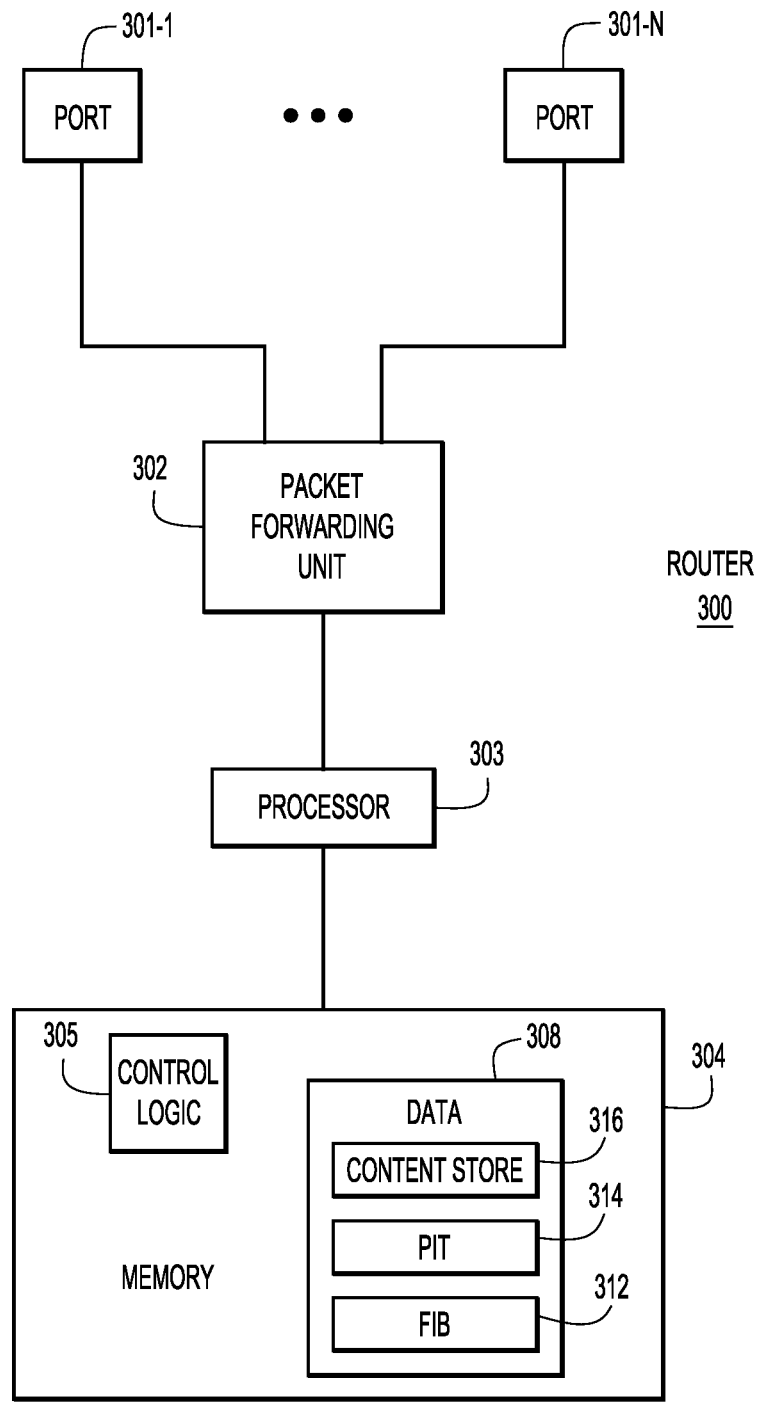
FIG. 3 is an illustration of a router or orchestrator node configured to perform IB-YANG-based forwarding, according to an example embodiment.

With reference to FIG. 3, there is an illustration of an example router device 300 (also referred to more simply as "router 300") configured to support IB-YANG forwarding. Router 300 has Intent request and packet forwarding capabilities to support the IB-YANG forwarding. To this end, router 300 comprises a plurality of network ports or output interface 301-1 through 301-N (also referred to as "interfaces") to receive and forward/transmit Intent requests and data packets, a packet forwarding unit 302 to route the Intent requests and data packets between the network ports/faces, a processor 303 (or multiple processors) and memory 304.

Memory 304 may comprise read only memory (ROM), random access memory (RAM), magnetic disk storage media devices, optical storage media devices, flash memory devices, electrical, optical, or other physical/tangible (non-transitory) memory storage devices. The processor 303 is, for example, a microprocessor or a microcontroller that executes instructions stored in memory. Thus, in general, memory 304 may comprise one or more tangible computer readable storage media (e.g., a memory device) encoded with software comprising computer executable instructions and when the software is executed (by the processor 304) it is operable to perform the operations described herein. For example, memory 304 stores Control logic 305 to provide overall control of router 300 and to implement the IB-YANG forwarding.

Memory 304 also stores data 308 produced and/or used by logic 305. In certain embodiments, data 308 includes the following data structures: a forwarding information base (FIB) 312; a pending Intent table (PIT) 314 to store Intent requests; and a content store 316, including a cache of responses to previous Intent requests. PIT 314 and FIB 312 are grouped together into a packet cache to store pending Intent requests and completed Intent requests, i.e., Intent requests that have been satisfied.

Router 300 uses FIB 312 to route Intent requests that carry objects, based on elements of the IB-YANG model. FIB 312 exploits object class, object attributes, and a range of object parameters. FIB 312 maps the Intent requests to next hops in a forwarding plane. ICN is similar to the IP in that ICN forwards messages using Longest Prefix Match (LPM) over name prefixes. For forwarding of Intent requests associated with objects, embodiments presented herein replace LPM with maximal subset match (MSM) over multiple object attributes. FIB 312 typically uses a routing/forwarding protocol to establish routing to a resource offering a YANG interface according to specific metrics (e.g., distance to resource, security policies, and business relations).

PIT 314 stores Intent requests for which responses have not yet been received. PIT 314 allows router 300 to detect multiple concurrent Intent requests, including incompatible concurrent Intent requests, and to aggregate the concurrent Intent requests when detected. PIT 314 also provides a view into a current state of the network of routers, e.g., to reveal which operations are currently under way in the network.

Content store 316 stores responses to recent Intent requests that have traversed router 300. The responses may include (YANG) objects and statuses of resources configured on resources nodes responsive to Intent requests. If another Intent request is received during a lifetime of a response, the Intent request can be satisfied directly from content store 316.

The data structures, FIB 312, PIT 314, and content store 316, are important for multipoint-to-multipoint communications, especially in the context or resource management. The data structures:
 a. Ensure consistency and tight synchronization: concurrent messages regarding the same resource can be detected and reconciled in a hop-by-hop fashion based on hits to PIT 314.
 b. Allow for more scalability: redundant requests detected and aggregated in the forwarding plane share and cache (popular) information close to users, which reduces network overhead and latency, thus increasing responsiveness for any user interface that uses the information.
 c. Offer resiliency, since the network can continue to at least partially operate even if disconnections between orchestrators occur.

Figure 4:
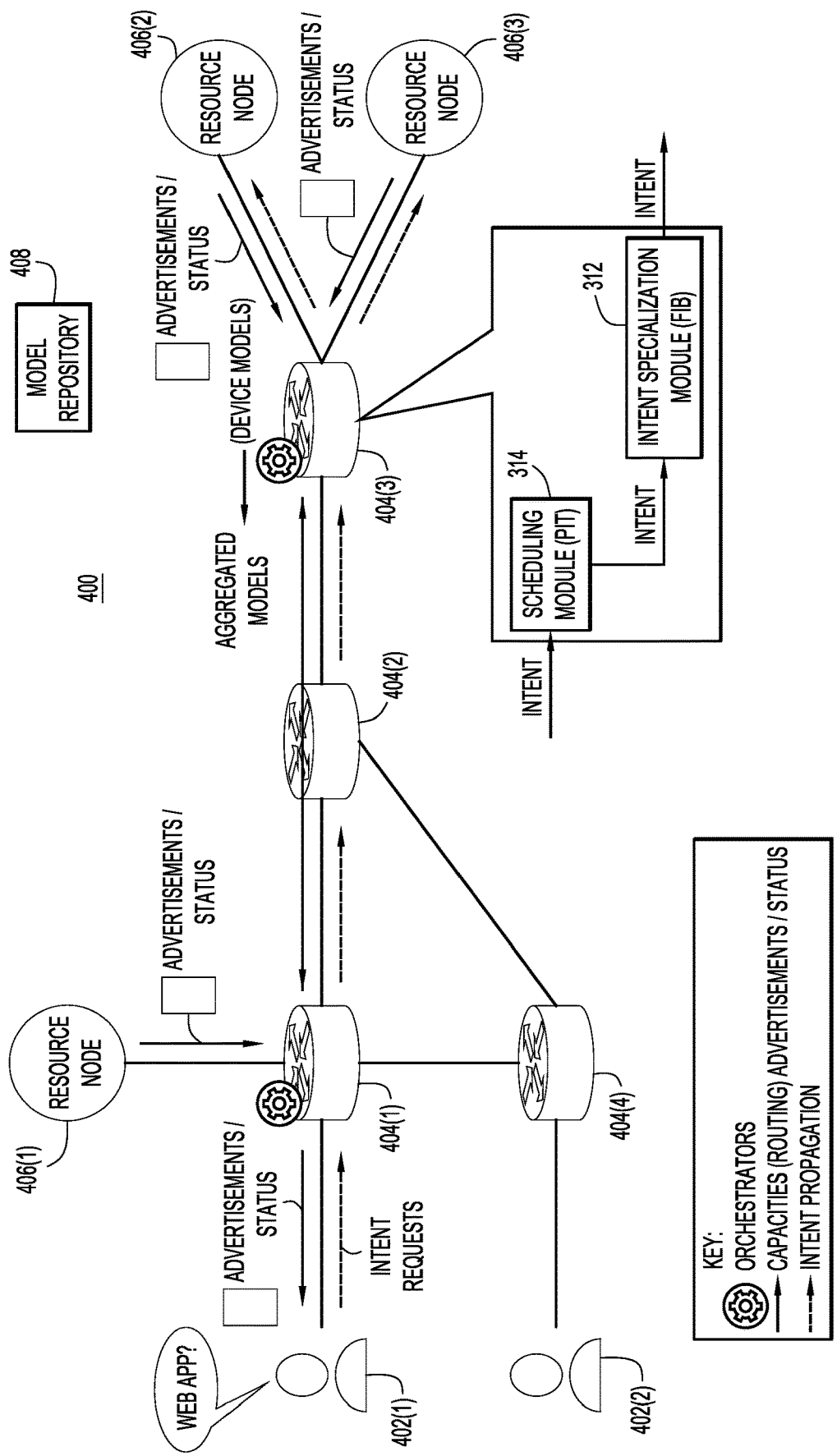
FIG. 4 is a block diagram of a network of routers that form a management network of routers to route Intent to resource nodes based on IB-YANG, according to an example embodiment.

With reference to FIG. 4, there is a block diagram of an example network environment 400 that includes a management network of routers to route Intent to resource nodes based on IB-YANG. Environment 400 includes user devices 402(1) and 402(2) (collectively referred to as "user devices 402"), a network of routers 404(1)-404(4) (collectively referred to as "routers 404" and individually referred to as a "router 404"), and resource nodes 406(1)-406(3) (collectively referred to as "resource nodes 406") connected to various ones of the routers, and an IB-model repository or database 408 of network models accessible to the user devices, the routers, and the resource nodes. Routers 404(1) and 404(3) connected to resource nodes 406(1) and 406(2), 406(3), respectively, are also referred to as "orchestrators." Routers 404 may each include a scheduling module in the form of local PIT 314, an intent specialization module in the form of local FIB 312, and a content store (not shown in FIG. 4). User devices 402, the network of routers 404, and resource nodes 406 may be part of one or more wide area networks (WANs), such as the Internet, and one or more local area network (LANs). Resource nodes 406 each host resources to be implemented/configured on the resource nodes in accordance with the embodiments presented herein. Examples of resources hosted on resource nodes 406 include Web applications, SQL databases, DNS services and databases, and so on. High-level operations performed in environment 400 are described below in connection with FIG. 5.

As will be described more fully below, resource nodes 406 advertise to routers 404 and user devices 402 resource capabilities supported by the resource nodes via advertisements originated at the resource nodes. Advertisement propagation paths traversed by the advertisements originated at resource nodes 406 are shown as solid-line arrows in FIG. 4. Also, user devices 402 originate Intent requests to configure the advertised resources on resources nodes 406, and the network of routers 404 propagate the Intent requests across the network of routers to the resource nodes. Intent request propagation paths traversed by the Intent requests are shown as dotted-line arrows in FIG. 4. Additionally, upon receiving respective Intent requests from the network of routers 404, resource nodes 406 configure their respective hosted resources responsive to the Intent requests, and then send status messages indicating success or failure of their configured resources back along the Intent request propagation paths. That is, the status messages follow the Intent request propagation paths and thus traverse routers 404 along those paths.

Figure 5:
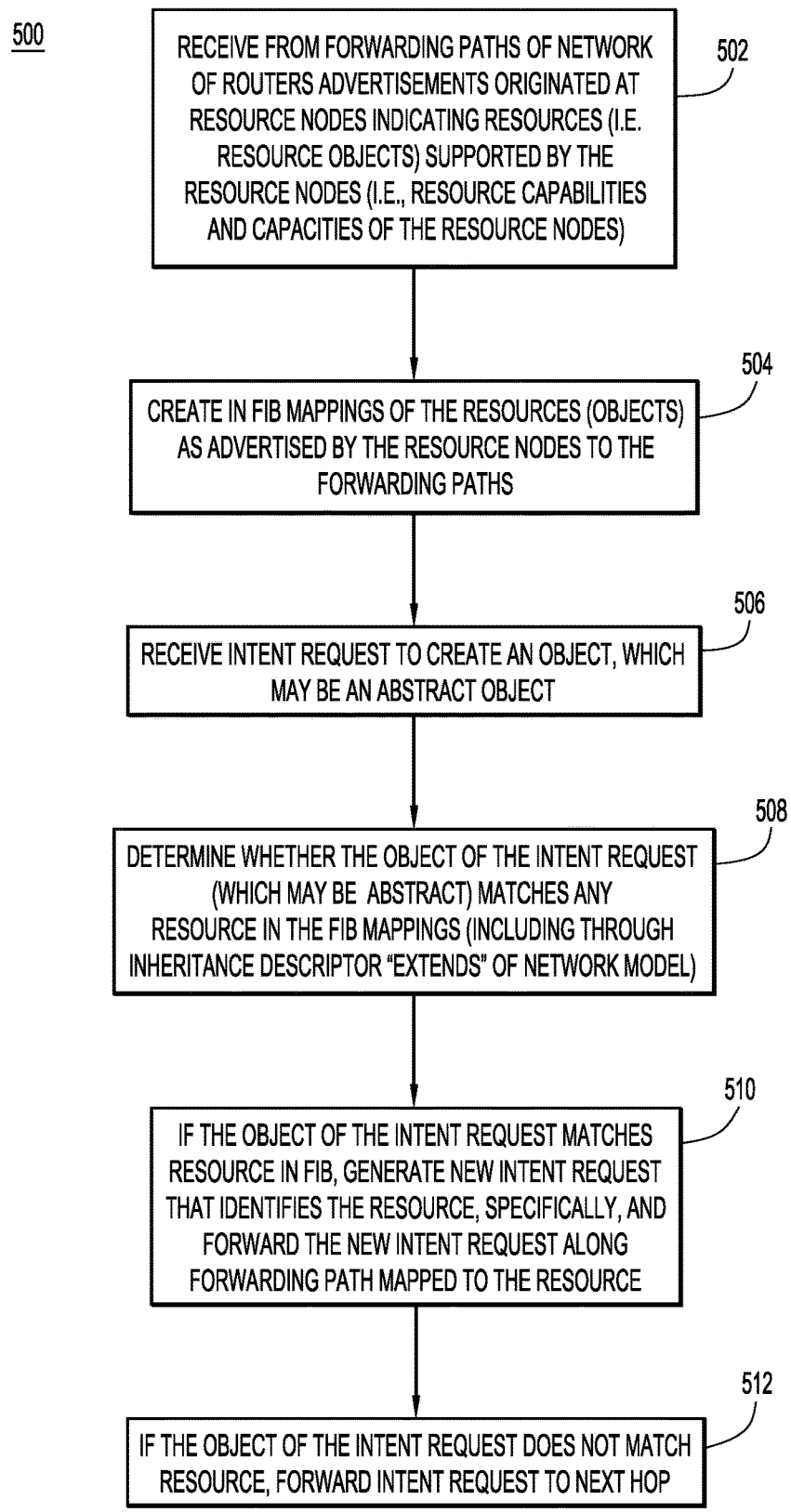
FIG. 5 is a flowchart of a high-level or generalized method of routing of Intent over the management network based on IB-YANG, according to an example embodiment.

With reference to FIG. 5, there is a flowchart of an example high-level method 500 of decentralized (i.e., distributed) distribution of configuration in network environment 400 via intent-based forwarding. Method 500 may be performed by each router 404 of the network of routers. Method 500 is described also with reference to FIG. 4. Method 500 assumes that IB-YANG models of repository 408 are accessible/available to user devices 402, routers 404, and resource nodes 406, when needed by those devices to implement operations of method 500. For example, various devices 402, 404, and 406 may retrieve the network models from repository 408, or a network manager device/entity may distribute the network models to the various devices.

At 502, resource nodes 406 advertise their respective resource capabilities in the form of device models to the network of routers 404 and user devices 402. The resources are "network resources" meaning that the resources, when configured on resource nodes 406, are accessible via networks connected to the network nodes. For example, resource nodes 406 originate and send advertisement messages advertising/indicating the resources (i.e., resource objects) supported on the resource nodes to routers 404. The advertisement messages may include, for example, specific names or other specific identifiers of the resources, IP addresses and/or media access control (MAC) addresses for the resource nodes that host the resources, IP addresses for resources that are offered as services on the resource nodes, specific Uniform Resource Locators (URLs) for the resource nodes and/or their hosted resources, authentication information (e.g., user names/owner names and passwords) associated with the resources, and other attributes that specifically identify the resources and their hosting resource nodes. The advertisements originated at resource nodes 406 traverse routers 404 as the advertisements flow from the resource nodes along the network paths shown as dotted-line arrows in FIG. 4. Routers 404 propagate the advertisements along the paths shown.

At 504, as the advertisements traverse routers 404, the routers store in their respective FIB s 312 indications of the advertised resource objects along with identifiers of the forwarding paths (with respect to the routers) from which the routers received the advertisements. The forwarding paths may be represented as outbound faces of routers 404. In this way, routers 404 create mappings of the advertised resource objects (more simply referred to as "resources") to the forwarding paths, and thus collectively construct a forwarding plane for Intent requests originated at user devices 402.

At 506, user devices 402 originate and send to the network of routers 404 Intent requests to configure resources hosted on resource nodes 406. Each Intent request represents a respective request to create an object carried in the request. The object carried in the Intent request includes a name or other identifier of the object, and may further include identifiers of sub-configuration objects, keywords/designators, and other attributes, as indicated in FIGS. 1 and 2, for example. The object may be an abstract object that implies one or more further abstract objects or one or more specific objects/resources (that are more specific than the abstract object) as advertised by resource nodes 406. Routers 404 receive the Intent requests.

At 508, based on information of the forwarding plane constructed at 502, and the network model stored in model repository 408, routers 404 propagate the Intent requests along Intent propagation paths (shown in dotted-line in FIG. 4) toward resource nodes 406 to configure the resource nodes. Specifically, each router 404 that receives an Interest request determines whether the Intent request, i.e., the object carried in the Intent request, matches an advertised resource stored in local FIB 312. To do this, upon receiving the respect Interest request, each router 404 searches local FIB 312 for any advertised resource that matches the object in the Interest request. In one example, the object may not be an abstract object, but rather an object that expressly identify/specify a resource that matches an advertised resource, directly. In another example, the object may be an abstract object, i.e., the object may imply a resource rather than expressly identify the resource. In that case, router 404 consults the network model in model repository 408 for any inheritance descriptors through which the object may inherent, and thereby match, an advertised resource.

At 510, if the object matches a resource in local FIB 312 (e.g., either directly or through inheritance), router 404 generates a new Interest request that specifically identifies the resource (object) from FIB 312 matched to the object. Information in the new Interest that is used to specifically identify the resource may be pulled from FIB 312 or the IB-YANG model for the resource, and may include the specific information provided in the advertisement messages. Router 404 forwards the new Interest request along a forwarding path mapped to the specifically identified resource (object) carried in the new Interest.

At 512, if there is no match, router 404 does not generate the new Interest request, and may forward the Interest request to the next hop.

Figure 6:
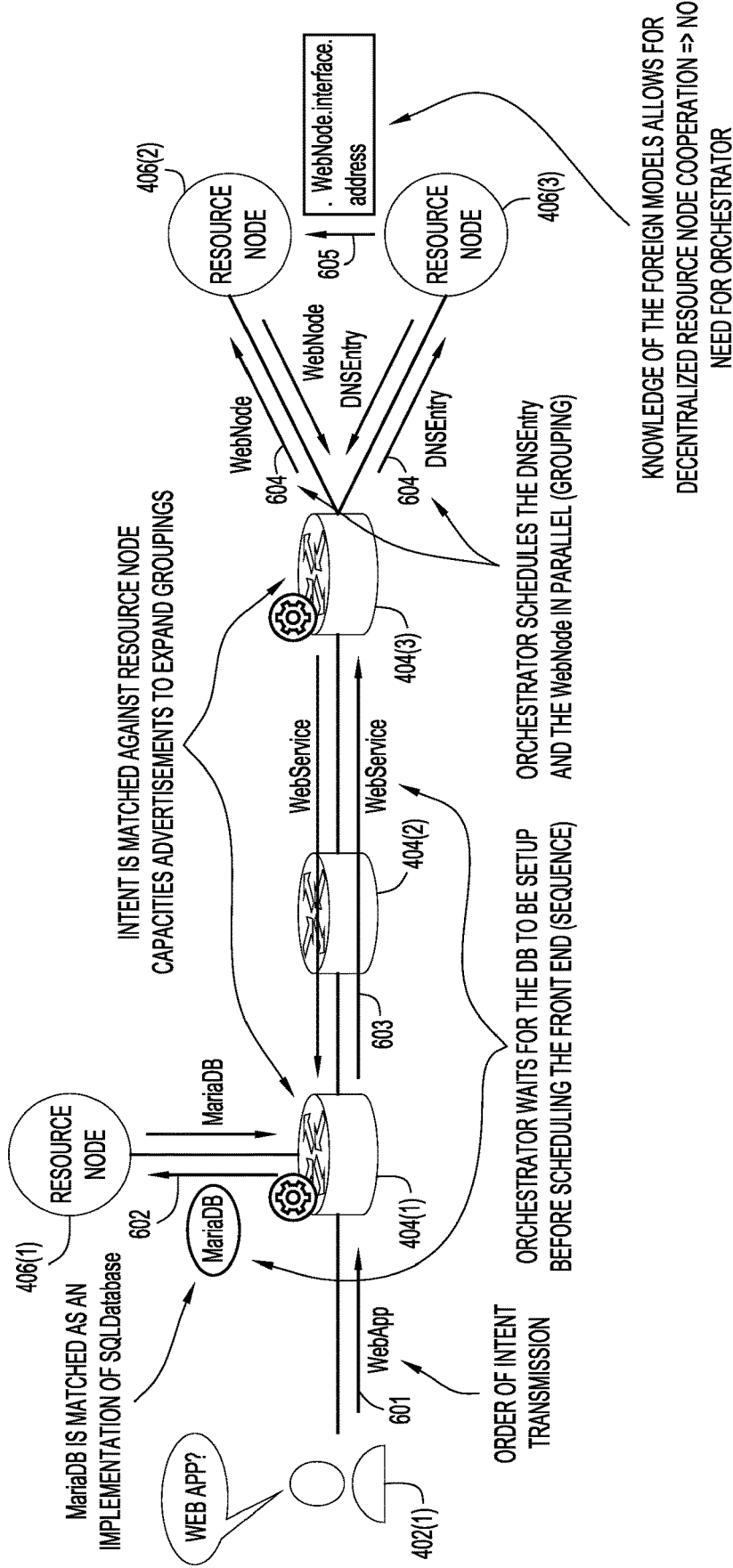
FIG. 6 is an illustration of an example of routing of Intent over the management network that employs the IB-YANG model of FIGS. 1 and 2, according to an example embodiment.

With reference to FIG. 6, there is an illustration of an example of method 500 performed in network environment 400 and that employs the IB-YANG model of FIGS. 1 and 2. FIG. 6 is described also with reference to FIGS. 1 and 2. In the example of FIG. 6, in an a priori or initial operation, resource nodes 406(1), 406(2), 406(3) initially send advertisements to advertise their specific resource capabilities in the form of resource objects MariaDB, WebNode, and DNSEntry, respectively. Upon receiving the advertisements, respective ones of routers 404 create entries in their respective FIB s 312 mapping the specific resource capabilities as advertised to the forwarding paths from which the advertisements for the resources were received. For example, router 404(1) maps MariaDB to an output face of router 404(1) that received the advertisement for MariaDB originated at resource node 404(1). Similarly, router 404(3) maps WebNode and DNSEntry to output faces of router 404(3) that received the corresponding advertisements originated at resource nodes 406(2) and 406(3). In this way, routers 404 establish a forwarding plane for subsequently received Interest requests corresponding to/that imply the advertised resources.

At 601, user device 402(1) sends to the network of routers 404 an Intent request for (i.e., to create/configure) object WebApp. Object WebApp includes first object DB of type SQLDatabase and second object FrontEnd of type WebService. Router 404(1) receives the Interest request, and determines that first object DB/SQLDatabase matches MariaDB in local FIB 312 based on (i) a maximum subset match of the Intent request to local FIB 312, and (ii) the inheritance designator ("extends") of abstract definition 102 through which SQLDatabase inherits MariaDB. As a result of the match, router 404(1) generates a new Intent request for MariaDB. Also, router 404(1) resolves second object FrontEnd/WebService based on a maximum subset match to local FIB 312 directly to an output face and not to a specialized Intent, and generates another new Intent request for object FrontEnd/WebService, separate from the new Intent request for MariaDB. Thus, router 404(1) decomposes the abstract Intent request for WebApp into the specific Interest request for MariaDB, and the abstract Interest request for WebService.

In accordance with the "sequence" designator, which indicates MariaDB is to be configured/instantiated before WebService, at 602, router 404(1) forwards to resource node 406(1) the specific Interest request for MariaDB. Upon receiving the specific Interest request, resource node 406(1) configures/instantiates MariaDB, and sends a status indicating success back to router 404(1), i.e., confirming that MariaDB is ready.

Also in accordance with the "sequence" designator, after forwarding the specific Interest request at 602 and receiving the status confirming that MariaDB is ready, at 603, router 404(1) forwards the Interest request for WebService to next hop router 404(3). Router 404(2) is oblivious to the management plane and only performs forwarding based on the IP address of packets that it receives.

Router 404(3) receives the Intent request for WebService, and decomposes the Intent request into designated "grouping" constituents WebNode and DNSEntry. Router 404(3) determines a match to WebNode in local FIB 312, and generates a new (specific) Intent request for WebNode. Router 404(3) also determines a match to DNSEntry in local FIB 312, and generates another new (specific) Intent request for DNSEntry. In accordance with the designated "grouping," WebNode and DNSEntry may be configured/instantiated in parallel of concurrently. Accordingly, at 604, router 404(3) concurrently forwards the new Interests for WebNode and DNSEntry to resource nodes 406(2) and 406(3), respectively. Upon receiving the respective specific Interest requests, resource nodes 406(2) and 406(3) (i) configure/instantiate WebNode and DNSEntry, respectively, and (ii) send respective status messages indicating success back to router 404(3) confirming that WebNode and DNSEntry are ready. Router 404(3) aggregates the status messages into an aggregate status message and sends the aggregated status message back toward routers 404(2) and 404(1).

At 605, DNSEntry may access WebNode directly, i.e., without communicating through any of routers 404, using the foreign module indicated in FIG. 2. To do this, DNSEntry accesses the foreign module in the network model stored in model repository 408.

Figure 7:
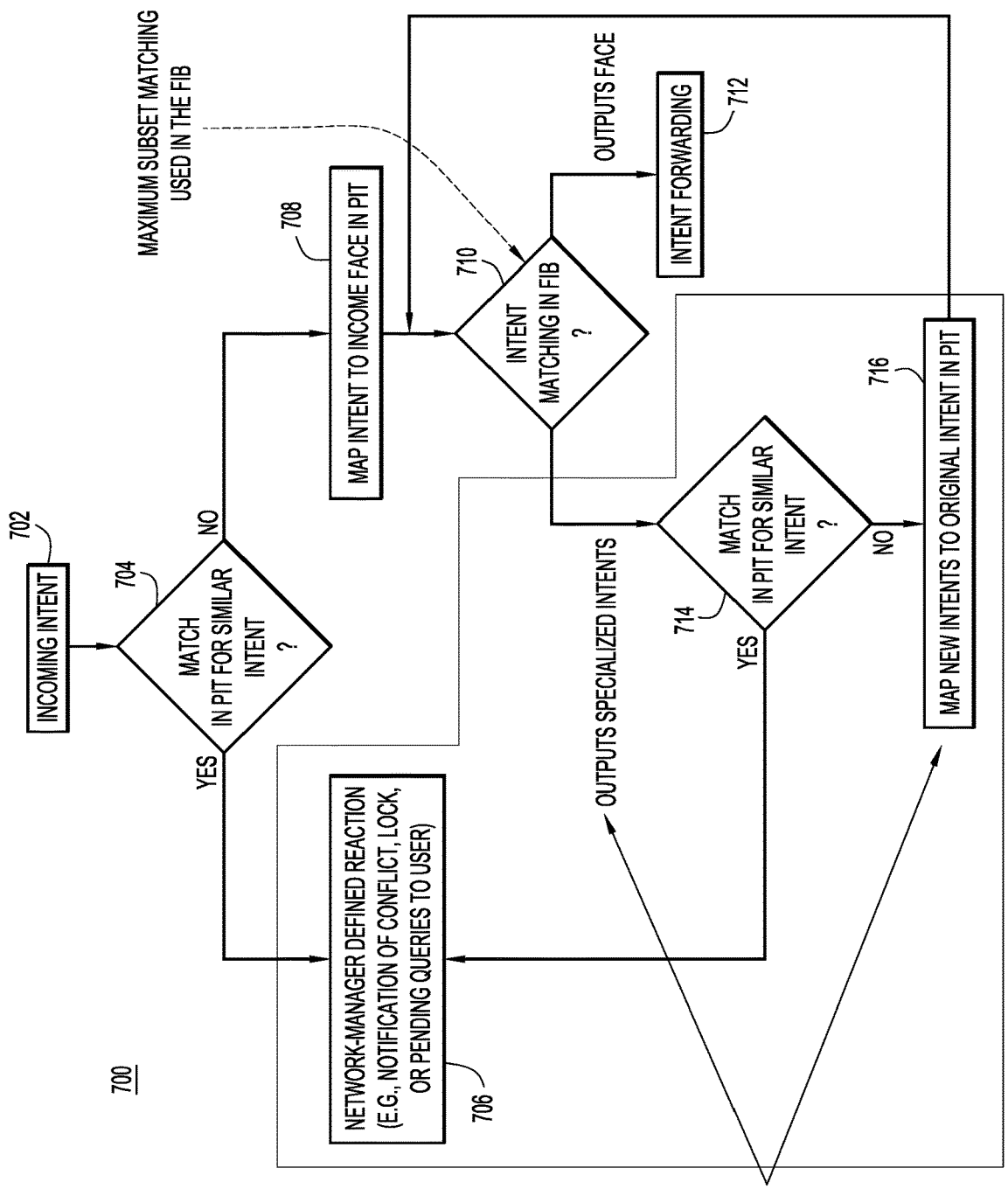
FIG. 7 is an illustration of a generalized method of processing Intent requests performed by the router of FIG. 3, according to an example embodiment.

With reference to FIG. 7, there is an illustration of an example generalized method 700 of processing Intent requests (referred to more simply as "Intents") in any of routers 404.

At 702, router 404 receives an Intent.

At 704, router 404 determines whether there is a match to the Intent in local PIT 314. If there is a match indicating that there is a competing Intent, flow proceeds to 706. If there is not a match, flow proceeds to 708.

At 706, router 404 performs a remediation action, which may be defined by a network manager. For example, router 404 may send to the network manager an indication of a conflict, or that there are pending Intents, enforce a lock on the concerned resource, or cancel an action. Then, depending on the remediation mechanism (e.g., after the lock is released, or upon issuance of an updated intent by the network operator) flow may return to 702.

At 708, router 404 registers the Intent in local PIT 314, which maps the Intent to an incoming face of the router. Flow proceeds to 710.

At 710, router 404 determines whether the Intent has a match in local FIB 312 based on MSM to either a more specific intent or to an output face. If there is a match to an output face, the flow proceeds to 712, where the Intent is forwarded to a next hop. On the other hand, if there is a match to a more specific Intent, there may be one or more specific objects corresponding to the (abstract) object specified in the Intent request. Router 404 may rely on the inheritance designator "extends" to assist in determining matches between abstract and specific objects in local FIB 312. In summary, at 710, FIB 312 associates an abstract model to either a next hop or a specialized intent. The FIB lookup is a single-step process that matches the intent to the abstract models in PIT 314 and returns whichever of a next hop or a specialized intent is found associated to the matched FIB entry. For each corresponding specific object, process flow loops through 714, 716, and 710 to resolve the specific objects into new Intents, as follows. At 714, router 404 repeats operation 704 for the specific object, i.e., the router determines whether local PIT 314 indicates a previous Interest for the specific object. If there is a match in PIT 314, flow proceeds to 706. If there is no match in PIT 314, flow proceeds to 716.

At 716, router 404 generates a new Intent for the specific object and forwards the new Intent to the forwarding path (e.g., output face) mapped to the specific object.

Figure 8:
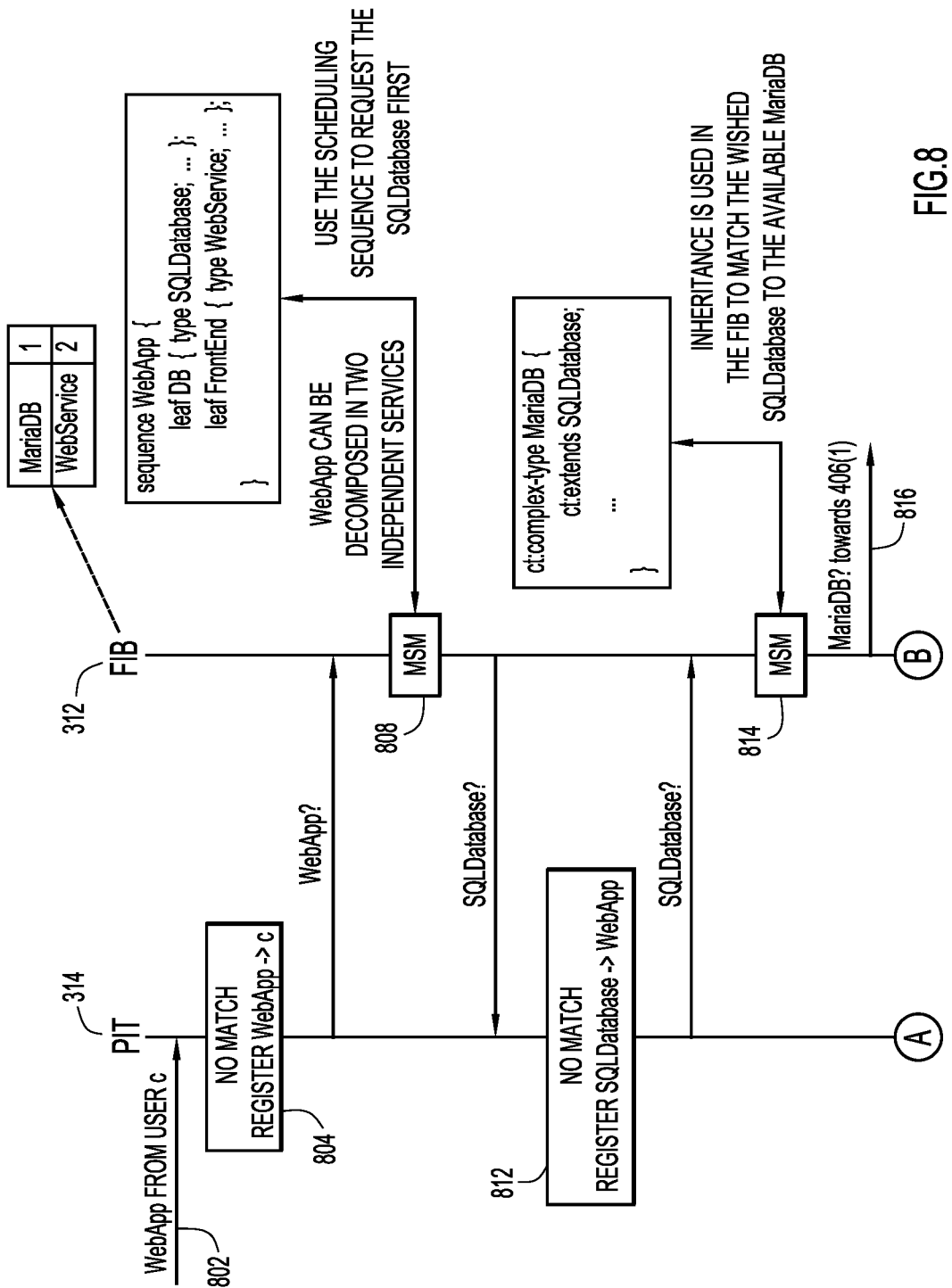
FIG. 8 is a transaction diagram for an example of the method of FIG. 7 performed by a router in the management network, according to an example embodiment.
Figure 9:
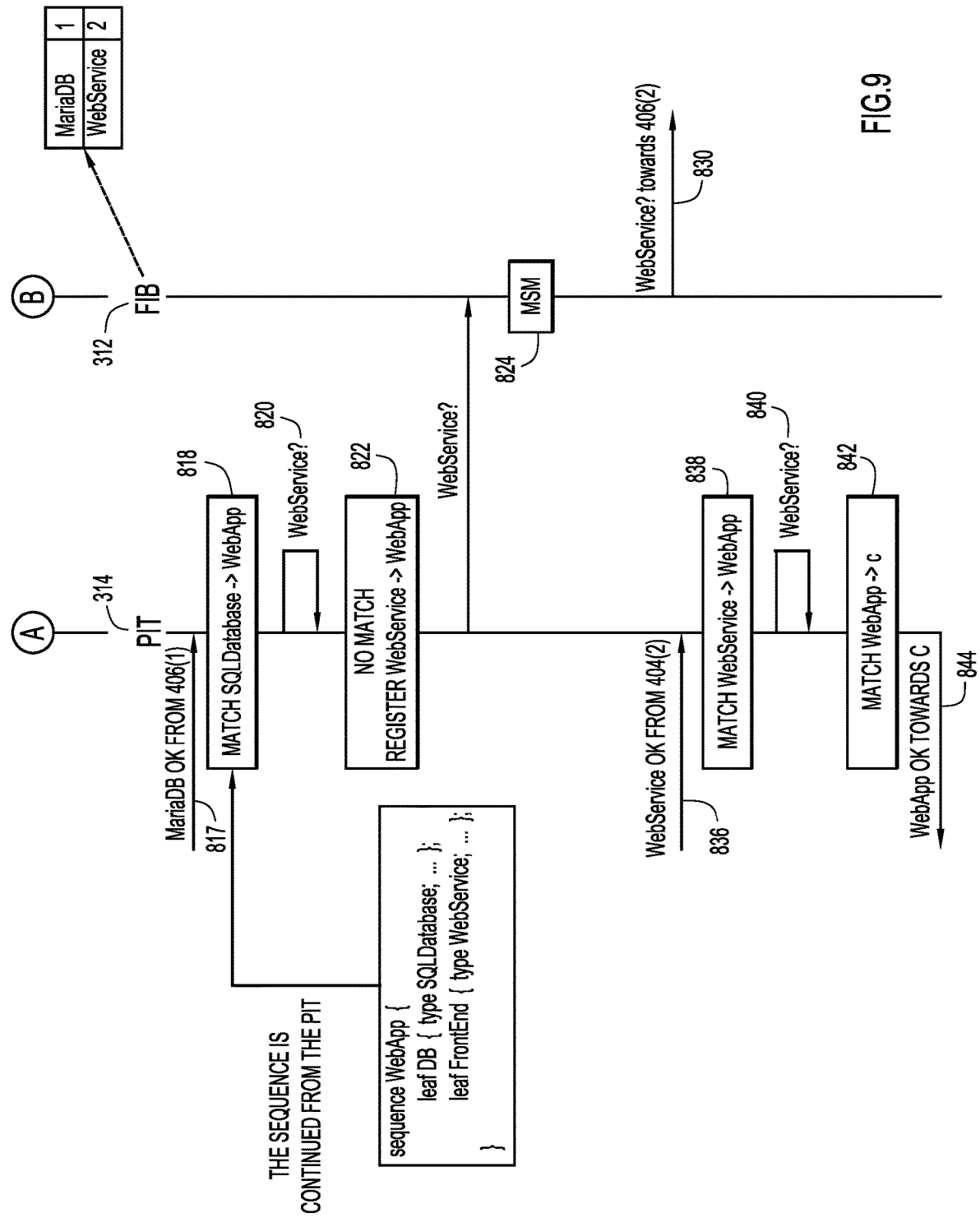
FIG. 9 is a continuation of the transaction diagram of FIG. 8, according to an example embodiment.

With reference to FIGS. 8 and 9, there is a transaction diagram for an example of method 700 performed by router 404(1) in the example scenario of FIG. 6. The transaction diagram shows transactions and actions related to local PIT 314 and local FIB 312 of router 404(1). In the transaction diagram, user device 402(1) is referred to as "user c." Also, it is assumed that FIB 312 includes entries for MariaDB and WebService as a result of previously received advertisements.

Referring first to FIG. 8, at 802, router 404(1) receives an Interest request for WebApp. At 804, router 404(1) determines there is no match in PIT 314 for the Interest request for WebApp, and forwards the Interest request to FIB processing. WebApp can be decomposed into two independent services, SQLDatabase and WebService. At 808, router 404(1) finds an MSM match to SQLDatabase in FIB 312, and forwards SQLDatabase to PIT processing. At 812, router 404(1) determines there is no match to SQLDatabase in PIT 314, and forwards SQLDatabase back to FIB processing. At 814, router 404 finds an MSM match to SQLDatabase relying on the "extends" designator through which SQLDatabase inherits MariaDB. Next, router 404(1) generates a specific Intent request for MariaDB and, at 816, forwards the specific Intent request along the forwarding path mapped to MariaDB.

The description of the transaction diagram now continues with reference to FIG. 9. At 817, router 404(1) receives from resource node 406(1) a message confirming success in instantiating MariaDB. At operations 818, 820, and 822, router 404 determines there is no match in PIT 314 to next resource object WebService, and forwards WebService to FIB processing. At 824, router 404(1) resolve WebService to logical next-hop router 404(3). As a result, router 404(1) generates an Intent request for WebService and, at 830, forwards the Intent request to next logical hop 404(3).

The Intent request for WebService propagates to router 404(3). As described above, router 404(3) resolves the Interest requests for WebService into two more specific Intent requests and forwards them to resource nodes 406(2) and 406(3). After instantiating/configuring their respective resources responsive to the specific Intent requests, resource nodes 406(2) and 406(3) return to router 404(3) respective status messages confirming success in setting-up their respective resources. Router 404(3) aggregates the status messages into an aggregate status that indicates WebService was successfully implemented, and forwards the aggregate status back to router 404(1) via intervening router 404(2).

At 836, router 404(1) receives from router 404(3) (via oblivious router 404(2)) the aggregate status indicating WebService has been successfully implemented. At 838, router 404(1) finds a match between WebService and WebApp in PIT 314. At 840, router 404(1) determines WebApp has been implemented successfully based on the status received at 836 and the status received at 817. At 842 and 844, router 404(1) finds in PIT 314 a match to WebApp and forwards to user c a status message indicated that WebApp has been implemented successfully. Router 404(1) forwards the message along a reverse path indicated in PIT 314.

Further embodiments presented herein permit realization of distributed configuration as described above in IP networks, and leveraging existing high speed implementations, such as ICN routers, building on vector packet processing (VPP) acceleration technology. The embodiments may techniques similar to hybrid-ICN (hICN) by mapping YANG objects to IP addresses. Specifically, the embodiments combine hICN with TAGNET, and encode routable parts of YANG objects in IPv6 addresses using Bloom filters, similar to the way TAGNET encodes descriptors.

Implementation of the forwarding, using subset matching operations instead of FIB longest-prefix matching operation, can be done though mechanisms adapted from TAGNET.

While this provides a throughput reduction at the router compared to traditional LPM forwarding, it is much more powerful and enables routing on the full YANG model. Those can be compensated by flow-level caching where a flow is defined by a collection of requests impacting the same group of resources (this is new with respect to regular ICN architectures, and relies on a multidimensional nature of the object representation with multiple attributes). Additional performance gains are expected from the handling of traffic at the content level.

Using this method, embodiments can perform routing over YANG objects in traditional IP networks without significant change in middleware. Accordingly, the embodiments combine hICN and TAGNET as applied to distributing network-policy configuration, and management control.

Figure 10:
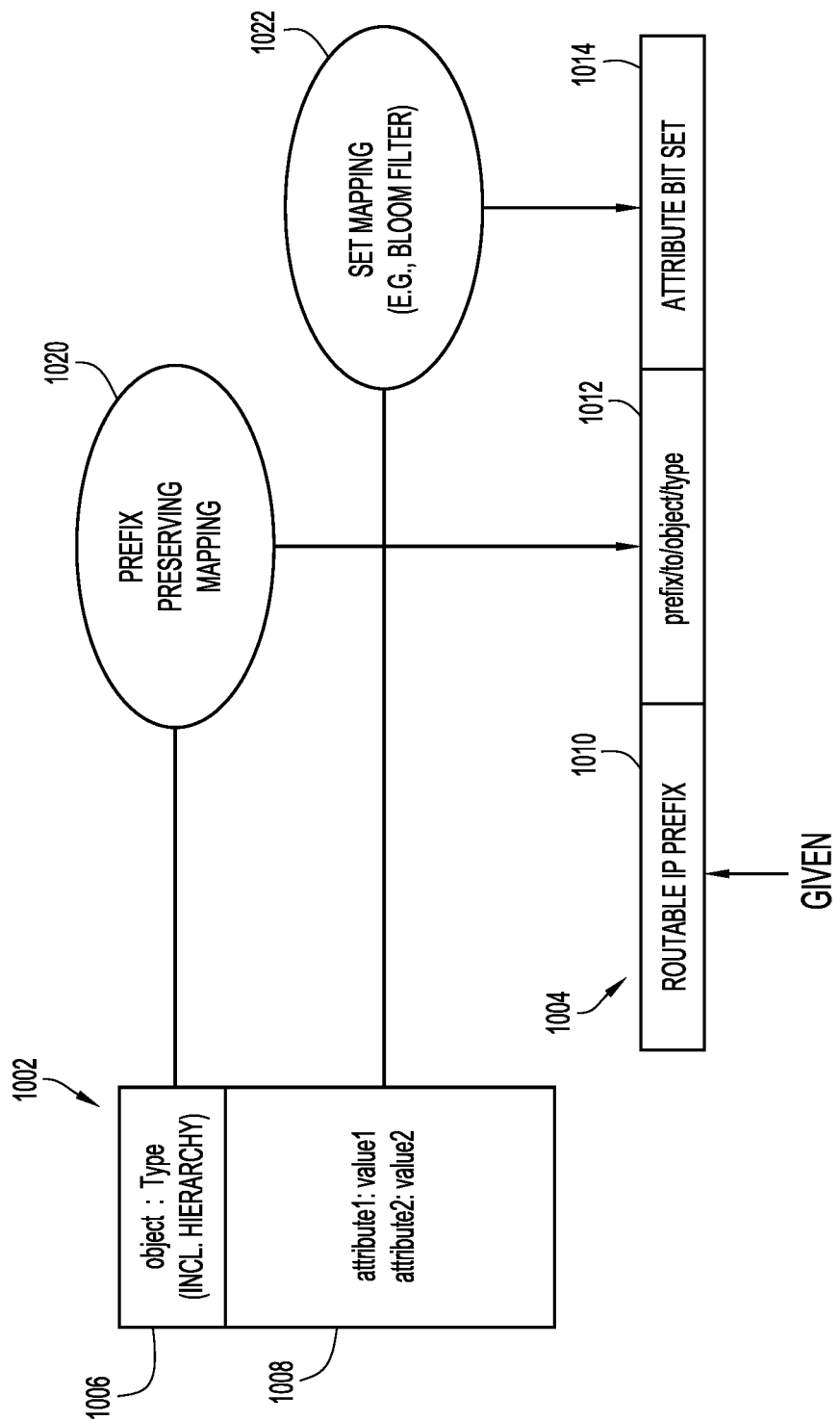
FIG. 10 is an illustration of configuration object-to-IP address mapping, according to an example embodiment.

With reference to FIG. 10, there is an illustration of an example of object-to-IP address mapping. In the example of FIG. 10, an object 1002 is mapped to an IP address 1004. Object 1002 includes an object type 1006 and attribute values 1008. IP address 1004 includes a routable IP address prefix 1010, a prefix-to-object type 1012, and an attribute bit set 1014. The mapping includes a first mapping 1020 (referred to as a prefix preserving mapping) that maps object type 1006 to prefix-to-object type 1012, and a second mapping 1022 that maps attribute values 1008 to attribute bit set 1014. Second mapping 1022 may include use of a Bloom filter, for example.

In summary, embodiments presented herein fundamentally change traditional network management protocol, switching from pushing configuration files to forwarding configuration intent. The embodiments provide a network model language and a network management protocol that can hold and route over intent. Such a protocol family offers the opportunity of completely decentralized orchestration systems, enabling fully programmable and self-orchestrating networks.

In one form, a method is provided comprising: at a router device among a network of router devices to configure resource nodes connected to the network in accordance with a configuration model including configuration objects that imply resources to be implemented as intent, but do not identify the resources specifically and do not identify the resource nodes on which to implement the resources: receiving, from forwarding paths in the network relative to the router device, advertisements originated at the resource nodes and that indicate resources supported by the resource nodes; creating mappings of the resources as advertised to the forwarding paths; receiving from the network an Intent request to create a configuration object among the configuration objects; determining whether the configuration object matches a resource in the mappings; and if the configuration object matches a resource in the mappings: generating a new Intent request that identifies the resource, specifically; and forwarding the new Intent request along one of the forwarding paths mapped to the resource.

The determining may include: determining whether the network model includes an inheritance descriptor through which the configuration object inherits the resource; and if the network model includes the inheritance descriptor, determining that the configuration object matches, otherwise determining that the configuration object does not match the resource.

The receiving may include receiving the Intent request from an incoming path in the network, and the method may further comprise, at the router device: receiving from the forwarding path a status message originated at one of the resource nodes that received the new Intent request, the status message indicating whether the one of the resource nodes successfully configured the resource responsive to the new Intent request; and forwarding the status message along the incoming path.

The receiving may include receiving the Intent request to include multiple configuration objects, and the method may further comprise, at the router device: determining whether the multiple configuration objects included in the Intent request match any corresponding resources in the mappings; if the multiple configuration objects match corresponding resources, generating corresponding new Intent requests that identify the corresponding resources; and forwarding the corresponding new Intent requests along corresponding forwarding paths mapped to the corresponding resources.

In the method, the receiving may also include receiving the Intent request to further include a sequence descriptor of the network model that prescribes a sequence for the multiple configuration objects, and the method may further comprise: performing the forwarding of the new Intent requests that identify the corresponding configuration objects in the sequence prescribed.

In the method, the receiving may also include receiving the Intent request to further include a grouping descriptor of the network model that indicates that the multiple configuration objects are not order specific, and the method may further comprise: performing the forwarding of the new Intent requests concurrently responsive to the grouping descriptor.

In the method, the configuration model may include a foreign module descriptor that includes an address pointer from the configuration object to a second configuration object for use by the resource to access a second resource corresponding to the second configuration object when the resource and the second resource are configured on corresponding resource nodes responsive to Intent requests for the configuration object and the second configuration object.

In the method, the creating the mappings may include storing in entries of a forwarding information base (FIB) mappings of the resources as advertised to corresponding ones of the forwarding paths from which the corresponding advertisements were received, and the determining may include searching the FIB for the match.

In the method, the searching the FIB for the match may include performing a maximum subset match (MSM) of the configuration object to the entries in the FIB.

The method may further comprise, at the router device: maintaining a pending Intent request table (PIT) in which previously received Intent requests are stored; upon receiving the Intent request from an incoming path of the network, searching the PIT for any previously received Intent request that is similar to the Intent request; if there is no previously received Intent request that is similar, storing the Intent request in the PIT along with an indication of the incoming path, and performing the searching the FIB; and if there is a previously received Intent request that is similar, neither storing the Intent request in the PIT nor performing the searching the FIB.

In the method, the network model includes a Yet Another Generation (YANG) model extended to include descriptors that define: inheritance through which a configuration object inherits a resource implied by the configuration object; a sequence in which to configure multiple resources implied by multiple configuration objects; and an ability to configure multiple resources implied by multiple configuration objects, concurrently.

In another form, an apparatus is provided comprising: multiple network ports; and a processor or a router device coupled to the network ports and configured to communicate with a network of router devices configured to configure resource nodes connected to the network in accordance with a configuration model including configuration objects that imply resources to be implemented as intent, but do not identify the resources specifically and do not identify the resource nodes on which to implement the resources, the processor further configured to perform: receiving, from forwarding paths in the network relative to the router device, advertisements originated at the resource nodes and that indicate resources supported by the resource nodes; creating mappings of the resources as advertised to the forwarding paths; receiving from the network an Intent request to create a configuration object among the configuration objects; determining whether the configuration object matches a resource in the mappings; and if the configuration object matches a resource in the mappings: generating a new Intent request that identifies the resource, specifically; and forwarding the new Intent request along one of the forwarding paths mapped to the resource.

In yet another form, a computer readable medium is provided. The computer readable medium stores instructions that, when executed by a processor of a router device among a network of router devices to configure resource nodes connected to the network in accordance with a configuration model including configuration objects that imply resources to be implemented as intent, but do not identify the resources specifically and do not identify the resource nodes on which to implement the resources, cause the processor to perform: receiving, from forwarding paths in the network relative to the router device, advertisements originated at the resource nodes and that indicate resources supported by the resource nodes; creating mappings of the resources as advertised to the forwarding paths; receiving from the network an Intent request to create a configuration object among the configuration objects; determining whether the configuration object matches a resource in the mappings; and if the configuration object matches a resource in the mappings: generating a new Intent request that identifies the resource, specifically; and forwarding the new Intent request along one of the forwarding paths mapped to the resource.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a router device among a network of router devices to configure resource nodes connected to the network:
   receiving, from forwarding paths in the network relative to the router device, advertisements originated at the resource nodes and that indicate resources supported by the resource nodes;
   creating mappings of the resources to the forwarding paths from which the advertisements of the resources were received;
   receiving from the network an Intent request that carries a configuration object configured according to a configuration model that is a Yet Another Generation (YANG) model, wherein the configuration object defines a configuration of a resource, but does not identify either the resource specifically or any of the resource nodes on which to configure the resource, wherein the receiving further includes receiving the Intent request to include multiple configuration objects that match corresponding resources and a sequence descriptor of the YANG model that prescribes a sequence that is a specific order when configuring the corresponding resources;
   determining whether the configuration object matches a resource in the mappings; and
   if the configuration object matches a resource in the mappings:
      generating a new Intent request that carries a new configuration object configured according to the configuration model and that identifies the resource, specifically; and
      forwarding the new Intent request along one of the forwarding paths mapped to the resource in the mappings to configure the resource;
   and
   forwarding corresponding new Interest requests that identify the corresponding resources along corresponding forwarding paths mapped to the corresponding resources in the sequence as prescribed.

2. The method of claim 1, wherein the determining includes:
   determining whether the configuration model includes an inheritance descriptor through which the configuration object inherits the resource; and
   if the configuration model includes the inheritance descriptor, determining that the configuration object matches, otherwise determining that the configuration object does not match the resource.

3. The method of claim 1, wherein the receiving the Intent request includes receiving the Intent request from an incoming path in the network, and the method further comprises, at the router device:
   receiving from the one of the forwarding paths a status message originated at one of the resource nodes, the status message indicating whether the one of the resource nodes successfully configured the resource responsive to the new Intent request; and
   forwarding the status message along the incoming path.

4. The method of claim 1, wherein the corresponding resources include a database.

5. The method of claim 1, wherein the corresponding resources include a Doman Name System (DNS) entry.

6. The method of claim 1, wherein the receiving includes receiving the Intent request to include further configuration objects and a grouping descriptor of the configuration model that indicates that the further configuration objects are not order specific, and the method further comprises:
   performing forwarding of further new Intent requests for the further configuration objects concurrently responsive to the grouping descriptor.

7. The method of claim 1, wherein the configuration model includes a foreign module descriptor that includes an address pointer from the configuration object to a second configuration object for use by the resource to access a second resource corresponding to the second configuration object when the resource and the second resource are configured on corresponding resource nodes responsive to Intent requests for the configuration object and the second configuration object.

8. The method of claim 1, wherein:
   the creating includes storing in entries of a forwarding information base (FIB) mappings of the resources as advertised to corresponding ones of the forwarding paths from which the advertisements were received; and the determining includes searching the FIB for the resource that matches the configuration object.

9. The method of claim 8, wherein the searching the FIB for the resource that matches includes performing a maximum subset match (MSM) of the configuration object to the entries in the FIB.

10. The method of claim 8, further comprising, at the router device:
maintaining a pending Intent request table (PIT) in which previously received Intent requests are stored;
upon receiving the Intent request from an incoming path of the network, searching the PIT for any previously received Intent request that is similar to the Intent request;
if there is no previously received Intent request that is similar, storing the Intent request in the PIT along with an indication of the incoming path, and performing the searching the FIB; and
if there is a previously received Intent request that is similar, neither storing the Intent request in the PIT nor performing the searching the FIB.

11. The method of claim 1, wherein the YANG model is further extended to include descriptors that define one or more of: inheritance through which a configuration object inherits a resource implied by the configuration object; and an ability to configure multiple resources implied by multiple configuration objects, concurrently.

12. An apparatus comprising:
multiple network ports; and
a processor of a router device coupled to the network ports and configured to communicate with a network of router devices configured to configure resource nodes connected to the network, the processor further configured to perform:
receiving, from forwarding paths in the network relative to the router device, advertisements originated at the resource nodes and that indicate resources supported by the resource nodes;
creating mappings of the resources to the forwarding paths from which the advertisements of the resources were received;
receiving from the network an Intent request that carries a configuration object configured according to a configuration model that is a Yet Another Generation (YANG) model, wherein the configuration object defines a configuration of a resource, but does not identify either the resource specifically or any of the resource nodes on which to configure the resource, wherein the receiving further includes receiving the Intent request to include multiple configuration objects that match corresponding resources and a sequence descriptor of the YANG model that prescribes a sequence that is a specific order when configuring the corresponding resources;
determining whether the configuration object matches a resource in the mappings; and
if the configuration object matches a resource in the mappings:
generating a new Intent request that carries a new configuration object configured according to the configuration model and that identifies the resource, specifically; and
forwarding the new Intent request along one of the forwarding paths mapped to the resource in the mappings to configure the resource; and
forwarding corresponding new Interest requests that identify the corresponding resources along corresponding forwarding paths mapped to the corresponding resources in the sequence as prescribed.

13. The apparatus of claim 12, wherein the processor is configured to perform the determining by:
determining whether the configuration model includes an inheritance descriptor through which the configuration object inherits the resource; and
if the configuration model includes the inheritance descriptor, determining that the configuration object matches, otherwise determining that the configuration object does not match the resource.

14. The apparatus of claim 12, wherein the corresponding resources include a database.

15. The apparatus of claim 12, wherein the corresponding resources include a Doman Name System (DNS) entry.

16. The apparatus of claim 12, wherein the processor is configured to perform the receiving by receiving the Intent request to include further configuration objects and a grouping descriptor of the configuration model that indicates that the further configuration objects are not order specific, and the processor is further configured to perform forwarding further new Intent requests for the further configuration objects concurrently responsive to the grouping descriptor.

17. The apparatus of claim 12, wherein the YANG model is further extended to include descriptors that define one or more of: inheritance through which a configuration object inherits a resource implied by the configuration object; and an ability to configure multiple resources implied by multiple configuration objects, concurrently.

18. A non-transitory computer readable medium encoded with instructions that, when executed by a processor of a router device among a network of router devices to configure resource nodes connected to the network, cause the processor to perform:
receiving, from forwarding paths in the network relative to the router device, advertisements originated at the resource nodes and that indicate resources supported by the resource nodes;
creating mappings of the resources to the forwarding paths from which the advertisements of the resources were received;
receiving from the network an Intent request that carries a configuration object configured according to a configuration model that is a Yet Another Generation (YANG) model, wherein the configuration object defines a configuration of a resource, but does not identify either the resource specifically or any of the resource nodes on which to configure the resource, wherein the receiving further includes receiving the Intent request to include multiple configuration objects that match corresponding resources and a sequence descriptor of the YANG model that prescribes a sequence that is a specific order when configuring the corresponding resources;
determining whether the configuration object matches a resource in the mappings; and
if the configuration object matches a resource in the mappings:
generating a new Intent request that carries a new configuration object configured according to the configuration model and that identifies the resource, specifically; and
forwarding the new Intent request along one of the forwarding paths mapped to the resource in the mappings to configure the resource;
and forwarding corresponding new Interest requests that identify the corresponding resources along corresponding forwarding paths mapped to the corresponding resources in the sequence as prescribed.

19. The non-transitory computer readable medium of claim 18, wherein the determining includes:
   determining whether the configuration model includes an inheritance descriptor through which the configuration object inherits the resource; and
   if the configuration model includes the inheritance descriptor, determining that the configuration object matches, otherwise determining that the configuration object does not match the resource.

20. The non-transitory computer readable medium of claim 18, wherein the corresponding resources include a database.

* * * * *